United States Patent [19]

Kohno et al.

[11] Patent Number: 5,443,913
[45] Date of Patent: Aug. 22, 1995

[54] MAGNETIC RECORDING MEDIUM

[75] Inventors: Masahide Kohno, Nagano; Kazuhiro Kuroda, Tokyo; Yasushi Ishikawa, Nagano; Hideki Sasaki, Nagano; Yasufumi Takasugi, Nagano; Tsunehiko Ikarashi, Nagano; Osamu Inoue, Nagano, all of Japan

[73] Assignee: TDK Corporation, Tokyo, Japan

[21] Appl. No.: 136,281

[22] Filed: Oct. 15, 1993

[30] Foreign Application Priority Data

Oct. 16, 1992 [JP] Japan .................. 4-304739
Oct. 16, 1992 [JP] Japan .................. 4-304740
Oct. 16, 1992 [JP] Japan .................. 4-304741
Jun. 30, 1993 [JP] Japan .................. 5-187299

[51] Int. Cl.⁶ .................................................. G11B 5/00
[52] U.S. Cl. ................................. 428/425.9; 428/522; 428/694 BU; 428/694 BC; 428/694 BG; 428/694 BB; 428/900
[58] Field of Search ...... 428/425.9, 694 BU, 694 DC, 428/694 BG, 694 BB, 522

[56] References Cited

U.S. PATENT DOCUMENTS

| | | | |
|---|---|---|---|
| 4,663,184 | 5/1987 | Hegel | 427/44 |
| 4,716,077 | 12/1987 | Okita et al. | 428/328 |
| 4,842,942 | 6/1989 | Yatsuka et al. | 428/425.9 |
| 5,068,145 | 11/1991 | Watanabe et al. | . |

FOREIGN PATENT DOCUMENTS

| | | |
|---|---|---|
| 60-101161 | 6/1985 | Japan . |
| 60-23814 | 11/1985 | Japan . |
| 60-238306 | 11/1985 | Japan . |
| 60-238309 | 11/1985 | Japan . |
| 60-238371 | 11/1985 | Japan . |
| 61-77134 | 4/1986 | Japan . |
| 62-40615 | 2/1987 | Japan . |
| 62-43830 | 2/1987 | Japan . |
| 62-195720 | 2/1987 | Japan . |
| 63-261530 | 10/1988 | Japan . |
| 63-273209 | 11/1988 | Japan . |
| 1-162218 | 6/1989 | Japan . |

Primary Examiner—Stevan A. Resan
Attorney, Agent, or Firm—Oblon, Spivak, McClelland, Maier, & Neustadt

[57] ABSTRACT

In a magnetic recording medium comprising on a non-magnetic substrate a magnetic layer obtained by dispersing ferromagnetic powder in an electron beam-curable resin followed by electron beam curing or a backcoat layer obtained by curing an electron beam-curable resin with electron beams, a combination of an electron beam-curable vinyl chloride resin having a sulfur-containing polar group and an electron beam-curable urethane resin having a phosphorus-containing polar group is used as the electron beam-curable resin. This results in improvements in dispersibility, surface smoothness, and electromagnetic characteristics, as well as a lowering of error rate in high density digital recording. Storage property is good.

14 Claims, 1 Drawing Sheet

MAGNETIC RECORDING MEDIUM

BACKGROUND OF THE INVENTION

1. Field of the Invention

This invention relates to a magnetic recording medium of the coating type.

2. Background Art

Magnetic recording media of the coating type have a magnetic layer of ferromagnetic powder dispersed in a binder on a non-magnetic substrate. The binders used are generally classified into a thermosetting type and an electron beam curing type. Binders of the electron beam curing type are advantageous for large scale production because of possible on-line curing after coating and orientation, but are low in dispersion of ferromagnetic powder, less liable to calendering and other processing after coating, and not necessarily satisfactory in electromagnetic characteristics as compared with binders of the thermosetting type. They have the disadvantages of poor electromagnetic characteristics and high error rates especially in the case of high sensitivity digital recording as employed in digital audio tape recorders (DAT).

For increasing the dispersibility in binders of the electron beam curing type, it was proposed in the art to use electron beam-curable resins having various polar groups (Japanese Patent Application Kokai (JP-A) Nos. 40744/1982, 0745/1982, 29145/1983, 29146/1983, 100222/1983, 92421/1982, 05927/1983, 8126/1983, 79427/1983, 146440/1983, 63221/1985, 120765/1985, 922/1986, 77134/1986, 89207/1986, 6430/1987, 28925/1987, 42322/1987, 43830/1987, 84422/1987, 88135/1987, 95724/1987, 267827/1989, 40615/1987, 195720/1987, 67314/1992, etc.). These binders, however, did not achieve satisfactory improvements and attempts were made to use two or more electron beam-curable resins having a polar group in combination (JP-A 127225/1984 246917/1986, 75071/1988, 279420/1988, 49122/1989, 92926/1989, 144210/1989, 68713/1990, etc.). All these prior art combinations were unsuccessful in achieving a satisfactory improvement in dispersion.

On the other hand, various magnetic tapes include a backcoat layer on the rear surface thereof remote from the magnetic layer for improving run, durability, and storage property. One typical backcoat-forming resin used in the prior art is a thermosetting combination of nitrocellulose and urethane resin to be crosslinked with polyisocyanate. This is because the nitrocellulose/urethane system is fully rigid and highly effective for preventing blocking between the magnetic layer and the backcoat layer in a hot humid environment.

However, the thermosetting type backcoat layer of this nitrocellulose/urethane system is low in dispersion of carbon black which is added for antistatic purposes, resulting in a rough surface, which causes toughening of the magnetic layer surface due to topographic transfer to the magnetic layer side and roll tightening when the backcoat layer is thermoset in a roll form, which in turn, results in increased error rates especially in the case of high density magnetic recording as employed in digital audio tape recorders (DAT). Such inconvenience might be eliminated by using a backcoat layer of the electron beam curing type. The backcoat layer of the electron beam curing type is also advantageous for large scale production because of possible on-line curing after coating.

However, nitrocellulose which is modified to be sensitive to electron beams is very difficult to handle because it can be decomposed upon exposure to electron beams. Then one would attempt to use electron beam-curable vinyl chloride resins instead of the nitrocellulose, but these resins are less rigid. Rigidity may be increased by increasing the content of vinyl chloride resin. The increased content of vinyl chloride resin, in turn, leads to brittle coatings which are liable to abrasion during tape run, resulting in increased error rates due to dusting.

Furthermore, prior art magnetic recording media using an electron beam-curable resin as a binder in their magnetic layer and backcoat layer are generally manufactured by the following two methods. That is, the first method is by coating one surface of a non-magnetic substrate, typically tape with one of the magnetic layer and backcoat layer, irradiating electron beams thereto for curing, winding the tape as a roll, thereafter coating the opposed surface of the tape with the other one of the magnetic layer and backcoat layer, and irradiating electron beams thereto for curing. The second method is by coating and curing the backcoat layer to one surface of tape and simultaneously therewith, coating and curing the magnetic layer to the other surface of tape.

Where magnetic recording media are manufactured by these methods, however, especially the backcoat layer becomes less flexible and more brittle so that it experiences greater abrasion at the contact with guide pins during operation in the deck, leaving abraded debris which can adhere to the magnetic layer surface with increased errors.

Making investigations on the preparation method of magnetic recording media, especially the method of irradiating electron beams to various layers for curing in order to solve the above-mentioned problems, we have found that since all the prior art methods are designed such that the backcoat layer is coated and then cured by irradiating electron beams directly to the backcoat layer, curing reaction can overrun so that the coating becomes brittle or weak.

Also, when the magnetic layer, backcoat layer and undercoat layer are formed in magnetic recording media by coating, coating compositions for forming the respective layers are used. These coating compositions often contain pigments such as carbon black. One of the binders used for dispersing pigments such as carbon black in the coating compositions is an electron beam-curable resin. As previously mentioned, the electron beam-curable resin is advantageous for large scale production because of possible on-line curing after coating. In preparing such coating compositions, resins of the solvent type are generally used by taking into account the stability of electron beam-functional groups.

However, if one attempts to disperse carbon black or the like in such a resin of the solvent type, it is often difficult to achieve desired dispersity. For example, a dispersing technique using a conventional kneader is difficult to disperse carbon black or the like because of a viscosity drop during kneading. Dispersing techniques using a mill with glass beads, metal media or ceramic media are also proposed while these techniques are difficult to set proper conditions including a choice of solvent and tend to invite an increase of viscosity with the progress of dispersion eventually to disable dispersion.

SUMMARY OF THE INVENTION

A primary object of the present invention is to provide a magnetic recording medium which uses a binder of the electron beam curing type based on a novel combination of polar group-containing electron beam-curable resins so that it may exhibit excellent characteristics as a medium for high density digital recording. More specifically, an object of the invention is to provide a magnetic recording medium which has high dispersibility, good calendering property, excellent electromagnetic characteristics, and reduced error rates in high density digital recording. Another object is to provide a magnetic recording medium including a backcoat layer which has high rigidity, minimal dusting and reduced error rates in high density digital recording. A further object is to provide a magnetic recording medium including a backcoat layer having a satisfactory degree of curing and flexibility. A still further object is to provide a magnetic recording medium which is prepared using a coating composition which contains an electron beam-curable resin as a binder and a pigment such as carbon so that in dispersing the pigment in the binder, the stability of the electron beam-functional group and the dispersity of the pigment are improved.

These objects are achieved by the present invention set forth below as (1) to (21).

(1) A magnetic recording medium comprising at least one constituent layer including a magnetic layer on a non-magnetic substrate, wherein at least one layer of said constituent layer contains a binder component obtained by curing an electron beam-curable resin with electron beams, said resin containing an electron beam-curable vinyl chloride resin having a sulfur-containing polar group and an electron beam-curable urethane resin having a phosphorus-containing polar group.

(2) The magnetic recording medium of (1) wherein said sulfur-containing polar group is a sulfate and/or sulfonate group.

(3) The magnetic recording medium of (2) wherein said sulfate and sulfonate groups are —SO$_4$K and —SO$_3$K, respectively.

(4) The magnetic recording medium of (1) wherein said electron beam-curable vinyl chloride resin is obtained by modifying a source vinyl chloride resin having a sulfur-containing polar group with a monomer having an ethylenically unsaturated double bond and an isocyanato group into electron beam-curable form.

(5) The magnetic recording medium of (4) wherein said ethylenically unsaturated double bond is joined to the skeleton of the vinyl chloride resin through a urethane bond.

(6) The magnetic recording medium of (1) wherein said phosphorus-containing polar group is at least one member of a phosphonic group, phosphinic group and phosphinous group.

(7) The magnetic recording medium of (6) wherein said electron beam-curable urethane resin contains PO$_3$Na as the phosphorus-containing polar group.

(8) The magnetic recording medium of (6) wherein said electron beam-curable urethane resin is obtained by modifying a source urethane resin to be sensitive to electrons, said source urethane resin being obtained from a monomer having a phosphinic moiety, phosphinous moiety or phosphonic moiety.

(9) The magnetic recording medium of (1) wherein said electron beam-curable vinyl chloride resin and said electron beam-curable urethane resin are contained in a weight ratio of from 70:30 to 90:10.

(10) The magnetic recording medium of (1) wherein the magnetic layer on the non-magnetic substrate is of ferromagnetic powder dispersed in a binder, said binder being obtained by curing said resin with electron beams.

(11) The magnetic recording medium of (1) which has a backcoat layer on one surface of the non-magnetic substrate and the magnetic layer of ferromagnetic powder dispersed in a binder on another surface of the non-magnetic substrate, said backcoat layer contains said binder component obtained by curing said resin with electron beams.

(12) The magnetic recording medium of (11) wherein the binder in said magnetic layer is obtained by coating said resin followed by electron beam curing.

(13) The magnetic recording medium of (11) wherein said backcoat layer contains a pigment.

(14) The magnetic recording medium of (12) wherein a backcoat layer coating composition is coated to the one surface of said non-magnetic substrate and then cured by irradiating electron beams to the backcoat layer coating through said non-magnetic substrate, and thereafter, a magnetic layer coating composition is coated to the other surface of said non-magnetic substrate remote from the backcoat layer and finally cured by irradiating electron beams directly to the magnetic layer coating.

(15) The magnetic recording medium of (14) wherein the magnetic layer is coated and cured within at least 24 hours after curing of the backcoat layer.

(16) The magnetic recording medium of (1) wherein at least one of said resins is a resin which is solid at room temperature, said solid resin is stored at a temperature of not higher than 10° C. before a coating composition is prepared therefrom, the temperature during preparation of the coating composition is lower than 100° C., and the coating composition is used to form said constituent layer.

(17) The magnetic recording medium of (16) wherein said coating composition contains a pigment.

(18) The magnetic recording medium of (17) wherein said pigment is carbon.

(19) The magnetic recording medium of (16) wherein said constituent layer is a backcoat layer.

(20) The magnetic recording medium of (16) wherein said constituent layer is an undercoat layer.

(21) The magnetic recording medium of (16) wherein said constituent layer is the magnetic layer.

BRIEF DESCRIPTION OF THE DRAWING

FIG. 1 illustrates various electron beam irradiation modes.

ILLUSTRATIVE CONSTRUCTION

Now the illustrative construction of the present invention is described in detail. The magnetic recording medium of the present invention preferably includes a magnetic layer coating of the electron beam curing type on a non-magnetic substrate of various resins such as polyester. It is obtained by coating a magnetic coating composition containing ferromagnetic powder and an electron beam-curable resin onto the substrate followed by electron beam curing.

The electron beam-curable resin used herein is a combination of an electron beam-curable vinyl chloride resin having a sulfur-containing polar group and an electron beam-curable urethane resin having a phosphorus-containing polar group. The magnetic recording medium of the invention preferably includes a magnetic layer coating on one surface and a backcoat layer on another surface of a non-magnetic substrate of various resins such as polyester. The back-coat layer is obtained by coating a coating composition containing an electron beam-curable resin followed by electron beam curing. The electron beam-curable resin used herein is of the same resin construction as above using an electron beam-curable vinyl chloride resin.

The vinyl chloride resin used as the skeleton of the electron beam-curable resin preferably has a vinyl chloride content of 60 to 100% by weight, more preferably 60 to 95% by weight. Exemplary suitable vinyl chloride resins include vinyl chloride-vinyl acetate-vinyl alcohol copolymers, vinyl chloride-vinyl alcohol copolymers, vinyl chloridehydroxyalkyl (meth)acrylate copolymers, and vinyl chloridevinyl acetate-vinyl alcohol-glycidyl (meth)acrylate copolymers, with copolymers of vinyl chloride with a monomer containing an epoxy group being preferred. They preferably have an average degree of polymerization of about 100 to about 900.

The vinyl chloride resin also has an unsaturated double bond which is preferably an acryl group $CH_2=CHCOO-$ or a methacryl group $CH_2=CHCH_3COO-$. Preferably the resin contains on average 1 to 20, more preferably 2 to 10 (meth) acryl groups in a molecule. The (meth) acryl group is preferably joined to the skeleton of the vinyl chloride resin through a urethane bond.

The electron beam-curable vinyl chloride resins have a polar group containing sulfur because dispersion of carbon black therein is improved so that a better backcoat layer may be formed. The polar group containing sulfur (S) is preferably a sulfate and/or sulfo group. Exemplary sulfate and sulfo groups are $-SO_4Y$ and $-SO_3Y$ wherein Y is H or an alkali metal. Most preferred is $Y=K$, that is, $-SO_4K$ and $-SO_3K$. Either one or both of the sulfate and sulfo groups may be contained and when both are contained, they are present in any desired proportion. Preferably a sulfur-containing polar group is contained in a molecule in an amount of 0.01 to 10% by weight, more preferably 0.1 to 5% by weight of sulfur atom.

Such an electron beam-curable vinyl chloride resin is preferably prepared as follows. First, a source vinyl chloride resin having a S-containing polar group and containing a hydroxyl group is furnished. This source vinyl chloride resin contains 3 to 60 hydroxyl groups, preferably 2 to 30 hydroxyl groups in a molecule and in addition to the S-containing polar group, optionally contains another polar group such as $=OPO_2Y$ group, $=PO_3Y$ group, $-COOY$ group, $-N(R)_2$ group, and $-N^+(R)_3-Z$ group wherein R is an alkyl group or hydrogen atom and Z is a halogen.

Suitable examples of the source vinyl chloride resin are those disclosed in JP-A 238371/1985, 101161/1985, 235814/1985, 238306/1985, and 238309/1985. These resins are obtained by polymerizing vinyl chloride, an epoxy group-containing monomer and optionally, another copolymerizable monomer in the presence of a radical release agent having a sulfur-containing strong acid residue such as ammonium persulfate and potassium persulfate. The radical release agent is generally used in an amount of 0.3 to 9.0% by weight, preferably 1.0 to 5.0% by weight of the monomers. More particularly, since most radical release agents having a sulfur-containing strong acid residue are water soluble, emulsion polymerization, suspension polymerization using alcohols such as methanol as a polymerization medium or solution polymerization using ketones as a medium is adequate.

Upon polymerization, another radical release agent commonly used in polymerization of vinyl chloride may be used in addition to the radical release agent having a sulfur-containing strong acid residue. Such other radical release agents include organic peroxides such as lauroyl peroxide, benzoyl peroxide, 3,5,5-trimethylhexanoyl peroxide, diisopropylperoxydicarbonate, di-2-ethylhexylperoxydicarbonate, di-2-ethoxyethylperoxydicarbonate, t-butyl-peroxypivalate, and t-butyl-peroxyneodecanoate; and azo compounds such as 2,2'-azobisisobutyronitrile, 2,2'-azobis-2,4-dimethylvaleronitrile, and 4,4'-azobis-4-cyanovaleric acid. It is also possible to combine the radical release agent having a strong acid residue with a reducing agent such as sodium formaldehydesulfoxylate, sodium sulfite, and sodium thiosulfate.

Examples of the suspension stabilizers include synthetic polymers such as polyvinyl alcohol, partially saponified polyvinyl acetate, cellulose derivatives such as methyl cellulose, hydroxypropyl cellulose, and carboxymethyl cellulose, polyvinyl pyrrolidone, polyacrylamide, maleic acid-styrene copolymers, maleic acid-methyl vinyl ether copolymers, and maleic acid-vinyl acetate copolymers and natural polymers such as starch and gelatin. Also useful are emulsifiers, for example, anionic emulsifiers such as sodium alkylbenzenesulfonate and sodium laurylsulfate and nonionic emulsifiers such as polyoxyethylene alkyl ethers and polyoxyethylene sorbitan fatty acid partial esters. Molecular weight modifiers such as trichloroethylene and thioglycol may be used if necessary.

Examples of the epoxy group-containing monomer include glycidyl ethers of unsaturated alcohols such as allyl glycidyl ether and methallyl glycidyl ether; glycidyl esters of unsaturated acids such as glycidyl acrylate, glycidyl methacrylate, glycidyl-p-vinylbenzoate, methylglycidyl itaconate, glycidyl ethylmaleate, glycidyl vinylsulfonate, and glycidyl (meth) allylsulfonate; and epoxide olefins such as butadiene monoxide, vinylcyclohexene monoxide, and 2-methyl-5,6-epoxyhexene. This monomer is generally used in an amount to provide at least 0.5% by weight of epoxy group in the copolymer.

Examples of the optional monomer which can be used in addition to the vinyl chloride and epoxy-containing monomer include vinyl carboxylates such as vinyl acetate and vinyl propionate; vinyl ethers such as methyl vinyl ether, isobutyl vinyl ether, and cetyl vinyl ether; vinylidenes such as vinylidene chloride and vinylidene-fluoride; esters of unsaturated carboxylic acids such as diethyl maleate, butylbenzyl maleate, di-2-hydroxyethyl maleate, dimethyl itaconate, methyl (meth) acrylate, ethyl (meth)acrylate, lauryl (meth)acrylate, and 2-hydroxypropyl (meth) acrylate; olefins such as ethylene and propylene; and unsaturated nitriles such as (meth)acrylonitrile.

The thus obtained source resins generally have an average degree of polymerization of 100 to 900, preferably 200 to 500 and a vinyl chloride content of at least 60% by weight. Such source resins are commercially available, for example, as MR-110 from Nippon Zeon K.K.

These source vinyl chloride resins are then modified to be curable with electron beams. Modification to be electron beam curable preferably use a monomer having at least one ethylenically unsaturated double bond and an isocyanato group in a molecule, but free of a urethane bond in a molecule. Such a monomer is typically 2-isocyanatoethyl (meth)acrylate. Better results are obtained where the isocyanato group and the acryl group are spaced a short distance as in this molecule whereby only one urethane bond is present between the molecule and the resin backbone.

Well-known methods for modifying thermosetting vinyl chloride resins to be electron beam curable include an ester modification method of reacting a compound having a (meth)acryl group and a carboxylic anhydride or carboxylic acid with a resin having a hydroxyl or carboxyl group and a urethane modification method of reacting a reaction product or adduct between tolylene diisocyanate (TDI) and 2-hydroxyethyl (meth)acrylate (2-HEMA) with a resin having a hydroxyl or carboxyl group. However, the ester modification method results in a brittle coating. The urethane modification method using the adduct results in poor surface properties. The use of 2-isocyanatoethyl (meth)acrylate allows for formation of a coating which is not brittle and improved in dispersity and surface properties even when the content of vinyl chloride resin is increased. Since the above-mentioned isocyanate-acrylate adduct TDI-2-HEMA already has a urethane bond in its molecule, there are present two urethane bonds in the branched molecular chain terminated with an acrylic double bond. The presence of these urethane bonds, coupled with the long chain, detracts from dispersibility. However, since the isocyanatoethyl methacrylate has no urethane bond in a molecule, there is only one urethane bond in the branched molecular chain which has a short branch chain, resulting in no loss of dispersibility. In addition, since a urethane bond is present in the molecular backbone, the coating does not become brittle even when the content of vinyl chloride resin is increased.

While (A) a source vinyl chloride resin polymer having a hydroxyl group and a sulfur-containing polar group is reacted with (B) a monomer to introduce an ethylenically unsaturated double bond through a urethane bond, any desired electron beam curing ability can be designed by selecting a molar ratio of vinyl chloride resin polymer having a hydroxyl group and another polar group (A) to monomer (B). However, a too high urethane bond concentration would result in a lowering of dispersibility as previously described. By reacting 1 to 20 molecules, preferably 2 to 10 molecules of monomer (B) per molecule of vinyl chloride resin polymer having a hydroxyl group and another polar group (A) to provide a compromise between dispersibility and curability, a radiation-curable resin having desired qualities of dispersibility and curability can be obtained.

The reaction of vinyl chloride resin polymer having a hydroxyl group and another polar group (A) with monomer (B) is carried out at a reaction temperature of up to 60° C. by optionally dissolving the vinyl chloride copolymer having a hydroxyl group and another polar group in any well-known organic solvent which does not participate in the reaction, and using any well-known urethane reaction catalyst and any well-known radical polymerization inhibitor such as hydroquinone. Such modified polymers are commercially available as TB-0246 from Toyobo K.K. and MR-301 from Nippon Zeon K.K.

According to the present invention, an electron beam-curable polyurethane resin is used in combination with the electron beam-curable vinyl chloride resin defined above. The combined use improves dispersibility and the quality of the magnetic layer and backcoat. The electron beam-curable urethane resin has a phosphorus-containing polar group. The preferred phosphorus-containing group is at least one of phosphonate groups ($=PO_3Y$), phosphinate groups ($=PO_2Y$) and phosphinous groups ($=POY$) wherein Y is H or an alkali metal. Among these, especially preferred Y is sodium (Na), and resins containing a $=PO_3Na$ as a sole or main polar group are preferred. These phosphorus-containing polar groups are preferably contained in a molecule in an amount of 0.01 to 10% by weight, 0.02 to 3% by weight calculated as phosphorus atom. The groups may be attached to the backbone or branches of the skeleton resin. Higher dispersibility is achieved particularly when such a resin is used in a composition for the backcoat layer.

The resin skeleton to which a phosphorus-containing polar group is attached is an electron beam-curable urethane resin. It is a phosphorus-containing electron beam-curable resin having at least one acrylic double bond in a molecule and obtained by reacting at least one of phosphorus compounds as will be described later, that is, a polyurethane acrylate resin bonded with an acrylic double bond-containing compound through a urethane bond.

The term acrylic double bond used herein refers to residues (acryloyl or methacryloyl groups) of acrylic acid, acrylates, acrylamides, methacrylic acid, methacrylates, methacrylamides, and the like. Preferred acrylic double bond-containing compounds (A) include mono(meth)acrylates of glycols such as ethylene glycol, diethylene glycol and hexamethylene glycol; mono(meth)acrylates and di(meth)acrylates of triol compounds such as trimethylol propane, glycerin, and trimethylol ethane; and mono(meth)acrylates, di(meth)acrylates, and tri(meth)acrylates of tetrahydric or higher polyols such as pentaerythritol and dipentaerythritol; and hydroxyl-containing acrylic compounds such as glycerin monoallyl ether and glycerin diallyl ether. At least one, preferably 2 to 20 such acrylic double bonds should be present in a binder molecule.

The polyurethane acrylate resins are generally obtained by reacting (B') a hydroxyl group-containing resin and (A') a hydroxyl group-containing acrylic compound with (C') a polyisocyanate-containing compound. Examples of the hydroxyl group-containing resin include polyalkylene glycols such as polyethylene glycol, polybutylene glycol, and polypropylene glycol, alkylene oxide adducts of bisphenol-A, various glycols, and polyester polyols having a hydroxyl group at the end of a molecular chain (B'). Preferred among these are polyurethane acrylate resins obtained from polyester polyols (B') as one component.

The carboxylic acid components of the polyester polyols (B') include aromatic dicarboxylic acids such as terephthalic acid, isophthalic acid, ortho-phthalic acid, and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid, and dodecanedicarboxylic acid; unsaturated fatty acids and alicyclic dicarboxylic acids such as fumaric acid, maleic acid, itaconic acid, tetrahydrophthalic acid, and hexahydrophthalic acid; tri- and tetracarboxylic acids such as trimellitic acid, trimesic acid, and pyromellitic acid.

Also the glycol components of the polyester polyols (B') include ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide adducts and propylene oxide adducts of bisphenol-A or the like, ethylene oxide adducts and propylene oxide adducts of hydrogenated bisphenol-A, polyethylene glycol, polypropylene glycol, and polytetramethylene glycol. Tri- and tetra-ols such as trimethylol ethane, trimethylol propane, glycerin, and pentaerythritol may be additionally used. Other useful polyester polyols are lactone series polyester diol chains obtained by ring-opening polymerization of lactones such as caprolactone.

Examples of the polyisocyanate (C') used herein include diisocyanates such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenyl ether, 1,5'-naphthalene diisocyanate, p-xylylene diisocyanate, m-xylylene diisocyanate, 1,3-diisocyanatomethylcyclohexane, 1,4-diisocyanatomethylcyclohexane, 4,4'-diisocyanatodicyclohexane, 4,4'-diisocyanatocyclohexylmethane, and isophorone diisocyanate, as well as less than 7 mol % based on the entire isocyanato group of triisocyanate compounds such as 2,4-tolylene diisocyanate trimers and hexamethylene diisocyanate trimers.

Preferred phosphorus (P) compounds used in the polyurethane acrylate resin used herein are phosphorus compounds represented by the following formulae (1) to (5).

$$\begin{array}{c} X_1-R_1-X_2 \\ | \\ R_2-P \\ | \\ O\ Y \end{array} \quad \text{Formula (1)}$$

$$\begin{array}{c} X_1-R_1-X_2 \\ | \\ R_2-P=O \\ | \\ O\ Y \end{array} \quad \text{Formula (2)}$$

$$\begin{array}{c} X_1-R_3-P-R_4-X_2 \\ | \\ O\ Y \end{array} \quad \text{Formula (3)}$$

$$\begin{array}{c} O \\ \| \\ X_1-R_3-P-R_4-X_2 \\ | \\ O\ Y \end{array} \quad \text{Formula (4)}$$

$$\begin{array}{c} R_4-X_1 \\ | \\ R_2-O-P=O \\ | \\ O\ Y \end{array} \quad \text{Formula (5)}$$

In the formulae, each of $X_1$ and $Y_2$ is an ester-forming functional group. $R_1$ is a divalent hydrocarbon group preferably having 8 to 10 carbon atoms, and $R_2$ is an alkyl group preferably having 1 to 12 carbon atoms, a cycloalkyl group, an aryl group, an alkoxy group preferably having 1 to 12 carbon atoms, a cycloalkoxy group, or an aryloxy group. The aryl and aryloxy groups may have a halogen atom, hydroxyl group, —OM' wherein M' is an alkali metal, or amino group attached thereto. Each of $R_3$ and $R_4$ is an alkylene group preferably having 1 to 12 carbon atoms, a cycloalkylene group, an arylene group, or a group represented by the formula: —$(CH_3OR_5)_m$ wherein $R_5$ is an alkylene group preferably having 1 to 12 carbon atoms, cycloalkylene group or arylene group and m may have an arbitrary value of 1 to 4. Y is an alkali metal atom, hydrogen, monovalent hydrocarbon group or amino group, with Na being preferred. Illustrative examples of these compounds are shown below as Nos. 1 to 37.

No. 1

No. 2

No. 3

No. 4

No. 5

No. 6

No. 7

-continued

No. 8:
2-ONa, phenyl-P(=O)(ONa)-CH$_2$CH(OH)CH$_2$OH

No. 9:
2-OH phenyl-P(=O)(ONa)-CH$_2$CH(OH)CH$_2$OH

No. 10:
CH$_3$CH$_2$-P(=O)(ONa)-CH$_2$CH(COOH)-CH$_2$-COOH

No. 11:
4-CH$_3$-C$_6$H$_4$-P(=O)(ONa)-CH(CH$_2$COOCH$_2$CH$_2$OH)(CH$_2$COOCH$_2$CH$_2$OH)

No. 12:
HOCH$_2$-P(ONa)-CH$_2$OH

No. 13:
P(CH$_2$CH$_2$OH)$_3$ · ONa

No. 14:
P(CH$_2$CHCH$_3$)$_2$(ONa)(OH)

No. 15:
P(CH$_2$CH$_2$CH$_2$OH)$_3$ · ONa

No. 16:
P(CH$_2$CH$_2$CH$_2$CH$_2$OH)$_3$ · ONa

No. 17:
HOCH$_2$CH$_2$-P(ONa)-CH$_2$CH$_2$COOCH$_2$CH$_2$OH

No. 18:
HOCH$_2$CH$_2$OCH$_2$-P(ONa)-CH$_2$OCH$_2$CH$_2$OH

No. 19:
CH$_3$-CHOH-CH$_2$OCH$_2$-P(ONa)-CH$_2$OCH$_2$-CHOH-CH$_3$

No. 20:
HOCH$_2$-P(=O)(ONa)-CH$_2$OH

No. 21:
O=P(CH$_2$CH$_2$OH)$_2$-ONa

No. 22:
O=P(CH$_2$CHCH$_3$·OH)$_2$-ONa

-continued

No. 23:
O=P(CH$_2$CH$_2$CH$_2$OH)$_2$-ONa

No. 24:
O=P(CH$_2$CH$_2$CH$_2$CH$_2$OH)$_2$-ONa

No. 25:
HOCH$_2$CH$_2$-P(=O)(ONa)-CH$_2$COOCH$_2$CH$_2$OH

No. 26:
HOCH$_2$CH$_2$-P(=O)(ONa)-CH$_2$CH$_2$COOH

No. 27:
HOCH$_2$CH$_2$OCH$_2$-P(=O)(ONa)-CH$_2$OCH$_2$CH$_2$OH

No. 28:
CH$_3$-CHOH-CH$_2$OCH$_2$-P(=O)(ONa)-CH$_2$OCH$_2$-CHOH-CH$_3$

No. 29:
HOOCCH$_2$CH$_2$CH$_2$OCH$_2$-P(=O)(ONa)-CH$_2$OCH$_2$CH$_2$CH$_2$COOH

No. 30:
CH$_3$O-P(=O)(ONa)-CH$_2$COOH

No. 31:
CH$_3$O-P(=O)(ONa)-CH$_2$COOCH$_3$

No. 32:
C$_2$H$_5$O-P(=O)(ONa)-CH$_2$COOCH$_3$

No. 33:
C$_2$H$_5$O-P(=O)(ONa)-CH$_2$CH$_2$COOH

No. 34:
C$_2$H$_5$O-P(=O)(ONa)-CH$_2$CH$_2$OH

No. 35:
C$_2$H$_5$O-P(=O)(KO)-CH$_2$CH$_2$OH

No. 36:
C$_2$H$_5$O-P(=O)(LiO)-CH$_2$CH$_2$OH

No. 37

These phosphorus compounds can be reacted at various steps. For example, in preparing polyester polyol (B') and a source resin of polyalkylene glycol, the phosphorus compound may be used as one component. Especially in preparing polyester polyol (B'), any of the aforementioned phosphorus compounds is added for reaction at any stage prior to the completion of polymerization of polyester polyol (B'). Alternatively, the phosphorus compounds may be used as one component of the reactants from which the polyurethane acrylate resin is prepared. For example, a polyurethane acrylate resin is prepared by reacting a phosphorus compound containing a hydroxyl group directly with an isocyanate compound (C'), polyester polyol (B') or acrylate compound (A').

These electron beam-curable urethane resins may be obtained by well-known reaction methods in a solvent or solventless system using an acrylic double bond-containing compound (A) and a particular phosphorus compound and/or a source material containing a starting resin having reacted with a particular phosphorus compound. The resulting resins desirably have a molecular weight of 500 to 100,000. These preparation methods are described in JP-A 43830/1987, 77134/1986, 40615/1987, and 195720/1987. And these resins are commercially available as TB-0242 from Toyobo K.K.

Desirably, the vinyl chloride resin having a sulfur-containing polar group and the urethane resin having a phosphorus-containing polar group are mixed in a weight ratio of from 7:3 to 9:1. Within this range, the magnetic layer and backcoat are substantially improved in quality. In addition to these resins, the binder may contain any of well-known resins in an amount of up to 20% by weight of the entire composition.

Illustrative examples of these additional resins are thermoplastic resins having contained or incorporated in a molecule thereof a group capable of crosslinking or polymerizing to dryness upon exposure to radiation, for example, an acrylic double bond as given by acrylic acid, methacrylic acid or esters thereof having an unsaturated double bond capable of radical polymerization, an allyl double bond as given by diallyl phthalate, and an unsaturated bond of maleic acid and maleic derivatives. Also useful are compounds having at least one unsaturated double bond capable of crosslinking or polymerizing upon exposure to electron beams.

The thermoplastic resins having contained or incorporated in a molecule thereof a group capable of crosslinking or polymerizing to dryness upon exposure to electron beams may be those resins having maleic acid or fumaric acid contained therein. The content of such acid is 1 to 40 mol %, preferably 10 to 30 mol % of the acid component from the considerations of crosslinking and radiation curability during preparation.

The following examples are included in the thermoplastic resins which can be modified into electron beam-curable resins. Included are vinyl chloride-vinyl acetatevinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcoholmaleic acid copolymers, vinyl chloride-vinyl acetate-OH terminated, alkyl branched copolymers, for example, vinyl chloride-hydroxyalkyl (meth) acrylate copolymers, vinyl chloride-allyl glycidyl ether copolymers, vinyl chlorideallyl glycidyl ether-hydroxylalkyl (meth)acrylate copolymers, VROH, VYNC, VYEGX, VERR, VYES, VMCA, VAGH, UCARMAG 520, and UCARMAG 528 (manufactured by U.C.C.), MR-110 (Nippon Zeon K.K.), Eslek E (Sekisui Chemical K.K.), and analogues. These copolymers may be modified to be electron beam sensitive by incorporating acrylic, maleic, or allyl double bonds. They may additionally contain a polar group such as carboxylic acid, potassium sulfonate, potassium sulfate, sodium phosphonate, and quaternary ammonium. Also useful are saturated polyester resins, polyvinyl alcohol resins, epoxy resins, phenoxy resins, cellulose derivatives and the like. Additional examples of the resins which can be subjected to electron beam sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, and acrylic resins containing at least one hydroxyl-bearing acrylate or methacrylate as a polymer component. They may be used alone or in admixture of two or more.

Elastomers or prepolymers are also useful and preferred examples thereof include polyurethane elastomers or prepolymers. Use of polyurethanes is very effective because of abrasion resistance and good adhesion to substrates, for example, PET film. Illustrative examples of the urethane compound include polyurethane elastomers and prepolymers which are condensation polymerization products from poly-functional isocyanates such as 2,4-toluenediisocyanate, 2,6-toluenediisocyanate, 1,3-xylenediisocyanate, 1,4-xylenediisocyanate, 1,5-naphthalenediisocyanate,.m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N, etc.; and polyesters, for example, linear saturated polyesters (as produced through polycondensation from polyhydric alcohols such as ethylene glycol, diethylene glycol, glycerin, trimethylol propane, 1,4-butanediol, 1,6-hexanediol, pentaerythritol, sorbitol, neopentylglycol, 1,4-cyclohexanedimethanol, etc. and saturated polybasic acids such as phthalic acid, isophthalic acid, terephthalic acid, succinic acid, adipic acid, sebasic acid, etc.), linear saturated polyethers (such as polyethylene glycol, polypropylene glycol, and polytetramethylene glycol), caprolactam, hydroxyl-containing acrylates and hydroxyl-containing methacrylates, and the like. It is very effective to react the isocyanate or hydroxyl terminal group of these urethane elastomers with a monomer having an acrylic or allyl double bond to modify them to be radiation sensitive. Also included are those terminated with an OH, COOH, sodium sulfonate, or phosphorus-containing group such as sodium phosphinate and sodium phosphonate as a polar group. Also included are monomers having active hydrogen capable of reacting with an isocyanato group and an unsaturated double bond capable of electron beam curing, for example, mono- and diglycerides of long chain fatty acids having an unsaturated double bond. Use of the aforementioned acryloyl-modified vinyl chloride copolymers in combination with these urethane elastomers is especially preferred in improving the degree of orientation and surface toughening. Additionally, acrylonitrilebutadiene copolymerized elastomers and polybutadiene elastomers are also preferred. Also, cyclic products of polybutadienes such as CBR-M901 from Nippon Synthetic Rubber K.K. offer satisfactory quality when combined with thermoplastic resins.

In curing such resins, electron beam is used in a dose of 10 to 200 kGray, typically 30 to 200 kGray, preferably 30 to 100 kGray, more desirably 30 to 70 kGray and with an irradiating energy (or accelerating voltage) of at least 100 kV, preferably 100 to 750 kV, more preferably 150 to 750 kV. Electron beam is desirably irradiated after coating and drying and prior to winding into a roll although irradiation after winding is acceptable.

There has been described the resin composition of the magnetic layer or backcoat layer of the magnetic recording medium according to the present invention while the remaining components of the magnetic layer is described below. It is understood that when the aforementioned resin composition is used in the backcoat layer of the magnetic recording medium, the magnetic layer may be either of the coating types including thermosetting type and electron beam curing type or of the continuous thin film type. In order to provide a magnetic recording medium having the advantages of possibility of in-line curing, increased dispersion, effective calendering, excellent electromagnetic characteristics, and a minimal error rate in high density digital recording, a magnetic recording medium having a magnetic layer coating of the electron beam curing type, that is, one prepared by applying a magnetic paint containing ferromagnetic fine powder and electron beam-curable resin to a substrate followed by curing with electron beam is most preferred. Namely, a magnetic layer of the aforementioned resin composition is preferred.

The ferromagnetic fine powder used in the magnetic layer is any such powder used in conventional magnetic recording media. Examples include oxide fine powders such as $\gamma$-$Fe_2O_3$ and other iron oxide particles, cobalt-doped $\gamma$-$Fe_2O_3$, $Fe_3O_4$, cobalt-doped $Fe_3O_4$, cobalt-doped Bertholide compounds, $CrO_2$, barium ferrite, and strontium ferrite, as well as well-known ferromagnetic metal fine powders such as Fe, Co, Ni and fine powders of alloys thereof. The ferromagnetic fine powder used is generally in needle, spindle or grain form and a choice may be made in accordance with the intended use of the magnetic recording medium. In general, particles having a length or major dimension of 0.1 to 1 $\mu$m and an aspect ratio of from 1 to 20 are preferred. In the case of plate particles, those having a particle size of 0.01 to 0.5 $\mu$m and a flakiness of 1 to 20 are preferred. Particles of needle form are used in video, audio and other tapes and preferably have a diameter of 0.1 to 0.5 $\mu$m and a needle ratio of from 4 to 15. They preferably have a specific surface (in BET value) of 20 to 70 $m^2$/g. Their coercive force Hc, saturation magnetization $\sigma_s$ and other magnetic properties may be properly selected for a particular purpose. In the magnetic layer, the ferromagnetic fine powder and binder resin are preferably present in a weight ratio of from 100:100 to 100:5, especially from 100:30 to 100:10.

The magnetic layer may contain an inorganic pigment. Exemplary inorganic pigments include (1) electrically conductive carbon black, graphite and graphitized carbon black and (2) inorganic fillers such as $SiO_2$, $TiO_2$, $\alpha$-$Al_2O_3$ having an alpha conversion of 60% or more, $Cr_2O_3$, SiC, CaO, $CaCO_3$, zinc oxide, $\alpha$-$Fe_2O_3$, talc, kaolin, $CaSO_4$, boron nitride, fluorinated graphite, molybdenum disulfide, and ZnS. Also useful are inorganic fine particles (of aerosil and colloidal types) such as $SiO_2$, $\gamma$-$Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, and $SnO_2$. These inorganic fine particles are available, for example, in the case of $SiO_2$, as (1) ultrafine particulate colloidal solutions of silicic anhydride (Snowtex, aqueous, methanol silica sol, etc., Nissan Chemical K.K.) and (2) ultrafine particulate anhydrous silica produced by burning pure silicon tetrachloride (standard product 100) (Aerosil, Nippon Aerosil K.K.). Ultrafine particulate aluminum oxide available as ultrafine particulate colloidal solutions like (1) and produced by a gas phase technique like (2) can also be used as well as titanium oxide and the above-mentioned inorganic fine particles. Among others, using carbon black or the like in combination with $\alpha$-$Al_2O_3$, $Cr_2O_3$, $TiO_2$, SiC, $\alpha$-$Fe_2O_3$ or the like is preferred. The amount of such inorganic pigments used is 1 to 30 parts by weight per 100 parts by weight of the ferromagnetic powder in the case of (1) and 1 to 30 parts by weight is appropriate for (2). Too much contents of inorganic pigments undesirably lead to brittle coatings which rather result in increased dropouts. The preferred size of inorganic pigments is up to 0.5 $\mu$m for both (1) and (2).

The magnetic layer is formed using a magnetic paint or coating composition which may further contain a solvent, dispersant, lubricant and the like. The solvent is not critical and may be suitably selected in consideration of the solubility of and Compatibility with the binder. For example, ketones such as acetone, methyl ethyl ketone, methyl isobutyl ketone, and cyclohexanone; esters such as ethyl formate, ethyl acetate, and butyl acetate; alcohols such as methanol, ethanol, isopropanol, and butanol; aromatic hydrocarbons such as toluene, xylene, and ethylbenzene; ethers such as isopropyl ether, ethyl ether, and dioxane; and furans such as tetrahydrofuran and furfural may be used as a single solvent or a solvent mixture. The solvent is used in a proportion of 10 to 10,000 parts by weight, especially 100 to 5,000 parts by weight per 100 parts by weight of the binder and about 100 to 1,000 parts by weight per 100 parts by weight of the ferromagnetic fine powder.

If desired, various additives such as dispersants and lubricants may be added to the magnetic coating composition. The lubricant may be any of various types of lubricants conventionally used in this type of magnetic layer and includes fatty acids having 12 or more carbon atoms (RCOOH wherein R is an alkyl group having 11 or more carbon atoms) such as caprylic acid, captic acid, lauric acid, myristic acid, palmitic acid, stearic acid, behenic acid, oleic acid, elaidic acid, linolic acid, linoleic acid, and stearolic acid; metal soaps comprising salts of the foregoing fatty acids with alkali metals (Li, Na, K, etc.) or alkaline earth metals (Mg, Ca, Ba, etc.); lecithin, etc. Also useful are higher alcohols having 12 or more carbon atoms, sulfate esters thereof, surface active agents, titanium coupling agents, silane coupling agents and the like. These lubricants (or dispersants) are added in amounts of 1 to 20 parts by weight per 100 parts by weight of the binder.

Other examples of the lubricant used herein include silicone oil, graphite, molybdenum disulfide, tungsten disulfide, fatty acid esters formed from monobasic fatty acids having 12 to 16 carbon atoms and monohydric alcohols having 3 to 12 carbon atoms, and fatty acid esters formed from monobasic fatty acids having 17 or more carbon atoms and monohydric alcohols which provide 21 to 23 carbon atoms together with the carbon atoms of the fatty acid. These lubricants are added in amounts of 0.2 to 20 parts by weight per 100 parts by weight of the binder.

The other additives which can be used herein are selected from such additives used in this type of magnetic layer. As an antistatic agent, for example, there may be used natural surface active agents such as saponin; nonionic surface active agents such as alkylene oxide, glycerin and glycidol compounds; cationic surface active agents such as higher alkyl amines, quaternary ammonium salts, pyridine and other heterocyclics, phosphonyl and sulfonyl compounds; anionic surface active agents having an acidic group such as sulfate and phosphate groups such as carboxylic acids, sulfonic acids, and phosphoric acids; and ampholytic active agents such as amino acids, aminosulfonic acids, and sulfate and phosphate esters of aminoalcohols.

The magnetic layer generally has a thickness of about 0.1 to 5 $\mu$m. The magnetic layer is formed by applying a magnetic coating composition by any well-known technique and effecting orientation in a magnetic field or mechanical orientation, followed by drying, surface smoothing, and curing. The curing conditions may be in the above-defined range.

The non-magnetic substrate used in the magnetic recording medium according to the present invention is not critical and depending on a particular purpose, it may be formed from a material selected from various flexible materials and various rigid materials to a predetermined shape and dimensions, typically tape in accordance with any of various standards. Exemplary flexible materials are polyesters such as polyethylene terephthalate as previously mentioned.

Next, the remaining components of the backcoat layer employing the aforementioned resin composition are described. The backcoat layer preferably contains 2 to 50% by weight of various carbon black species as an inorganic pigment. The preferred inorganic pigments are carbon species such as carbon black and graphite. The mean particle size is about 0.015 to 0.35 $\mu$m.

The backcoat layer is formed using a paint or coating composition which may contain, in addition to or instead of the carbon black and analogues, inorganic fine particles or inorganic fillers such as $SiO_2$, $TiO_2$, $\alpha$-$Al_2O_3$ (preferably having an alpha conversion of at least 60%), $Cr_2O_3$, SiC, CaO, $CaCO_3$, zinc oxide, Goethite, $\alpha$-$Fe_2O_3$, talc, kaolin, $CaSO_4$, boron nitride, fluorinated graphite, molybdenum disulfide, and ZnS in order to increase the mechanical strength of the backcoat layer. It is especially preferred to use them in combination with carbon black and analogues. Among others, inorganic fine particles such as $\alpha$-$Al_2O_3$, $Cr_2O_3$, $TiO_2$, and SiC are preferably contained. Their content is 0.5 to 10% by weight. Their mean particle size is about 0.05 to 0.5 $\mu$m.

The amount of the inorganic pigment used is preferably 20 to 200 parts by weight per 100 parts by weight of the binder in the case of carbon black and analogues and 10 to 300 parts by weight in the case of inorganic fine particles. Too much contents of inorganic pigments undesirably lead to brittle coatings which rather result in increased dropouts.

If necessary, the coating composition for the backcoat layer may contain various additives, for example, surface active agents such as fatty acids, fatty acid esters and silicone oil, and lubricants. Exemplary compounds of these additives are as previously described for the magnetic layer. The solvent used in preparing the coating composition for the backcoat layer may be a similar one.

The backcoat layer generally has a thickness of about 0.1 to 3 $\mu$m. The backcoat layer is formed by applying a coating composition by any well-known technique and effecting surface smoothing treatment, followed by drying and curing. Usually the magnetic layer is formed after the backcoat layer has been formed.

It is to be noted that the magnetic recording medium of the present invention may include a backcoat layer or an undercoat layer or the like if necessary.

The method for preparing the magnetic recording medium of the present invention is not critical. More specifically, the method for preparing a magnetic recording medium of the structure having a non-magnetic substrate, a magnetic layer formed on one surface of the substrate, and a backcoat layer formed on another surface of the substrate is not critical although the following preparation method is preferred.

Namely, the preparation method according to the invention involves first applying a coating composition for the backcoat layer to one surface of the non-magnetic substrate, irradiating electron beams to the coating through the non-magnetic substrate for curing it into a backcoat layer, then applying a coating composition for the magnetic layer to the other surface of the non-magnetic substrate remote from the backcoat layer, irradiating electron beams directly to the coating composition for curing the coating into a magnetic layer, thereby completing a magnetic recording medium. Since the backcoat layer is indirectly irradiated with electron beams through the non-magnetic substrate, adequate irradiation of electron beams is provided to the backcoat layer, resulting in the backcoat layer having an adequate degree of curing and flexibility.

In the conventional electron beam curing art, since the curing technique was designed as an extension of the old technique of ultraviolet radiation curing, it was believed essential to effect curing from the side of a subject to be irradiated. This technique must be employed particularly when conventionally proposed solventless type resins are used because coatings remain liquid until they are cured. However, when resins of the type to be dissolved in solvent that we favors to use for magnetic recording media are employed, coatings are solid insofar as the solvent has been dried off so that irradiation may be made from either the coating side or the substrate side. The attenuation of energy of electron beam irradiated from the substrate side depends on the thickness of the substrate, but is not substantial as demonstrated in the present invention if the substrate is about 5 to 100 $\mu$m thick for magnetic recording media, and is rather convenient in that the resin of the substrate is activated. Utilization of the activated state (coating and curing of the magnetic layer) should desirably be carried out as soon as possible after curing of the backcoat layer because adhesion of the magnetic layer to the non-magnetic substrate is improved thereby. Coating and curing of the magnetic layer should be done within 24 hours at the latest, especially within 0.1 second to 18 hours, though it depends on the thickness of the non-magnetic substrate. This is because it is presumed that when electron beam is irradiated to the surface of the non-magnetic substrate on which the magnetic layer is to be formed for curing of the backcoat layer, active species such as radicals are created in the resin adjacent to the magnetic layer forming side surface and that when an electron beam-curable magnetic coating composition is thereafter applied on this surface and cured with electron beam, chemical bonds are formed between the non-magnetic substrate and the coating. Electron beam may be irradiated under common conditions between the backcoat layer and the magnetic layer.

With respect to the properties of electron beam used in curing coatings, it is convenient to use an electron beam accelerator having an accelerating voltage of 100 to 750 kV, preferably 150 to 300 kV in view of permeability and to irradiate to provide an absorption dose of 10 to 200 kGray, preferably 30 to 200 kGray, more preferably 30 to 70 kGray.

Also in electron beam curing, it is important to irradiate radiation to the recording medium in an inert gas flow such as $H_2$ gas and He gas. Since a coating having a very high loading of magnetic particles like a magnetic coating is considerably porous, radiation irradiation in air prevents radicals created in the polymer from effectively participating in crosslinking reaction on crosslinking of the binder component due to the influence of ozone created by radiation irradiation. While this influence, of course, appears on the magnetic layer surface, the coating is affected to its interior by the inhibited crosslinking of the binder because of porosity. Accordingly, it is important that the atmosphere in which active energy radiation is irradiated be an atmosphere of an inert gas such as $N_2$, He, and $CO_2$ having an oxygen concentration of at most 1%.

The paint or coating compositions used in manufacturing the magnetic recording medium according to the present invention are obtained by adding to a solvent components which are selected for each of the layers. Such a coating composition is not critical although when the composition is prepared by using the above-mentioned electron beam-curable resins as a binder and dispersing a pigment such as carbon, better results are obtained by using a resin which is solid at room temperature (approximately 25° C.) as at least one of the electron beam-curable resins.

More particularly, at least one among the electron beam-curable resins is preferably a resin which is solid at room temperature (approximately 25° C.) and has a softening point of 50 to 150° C. This solid resin is preferably stored at a temperature of up to 10° C., more preferably −20° C. to 5° C. before use in the preparation of a coating composition. In preparing a coating composition by kneading and dissolving a composition containing the solid resin and a pigment, the composition is preferably maintained at a temperature of lower than 100° C., more preferably 70 to 95° C. during its preparation process. That is, the thermal cycle during the paint preparing process is preferably maintained below 100° C. By maintaining the temperature during storage of the solid electron beam-curable resin and the temperature during the paint preparing process in the above-defined ranges, respectively, there is prepared a coating composition in which the electron beam-sensitive group of the electron beam-curable resin is protected and which is improved in dispersion of the pigment. Therefore, if the coatings for backcoat layer, undercoat layer and magnetic layer of magnetic recording medium are formed using such coating compositions, the coatings are of improved quality. This results in a magnetic recording medium having improved properties. More particularly, a backcoat layer resulting from such a composition has advantages including minimal dusting and good surface property. An undercoat layer resulting from such a composition has advantages including good surface property which ensures that the magnetic layer has good surface property. A magnetic layer resulting from such a composition has advantages including good surface property and good electromagnetic characteristics. These advantages are obtained because the coating compositions used herein are improved in pigment dispersion as compared with electron beam-curable resins of the solution type conventionally used for maintaining the electron beam-sensitive group stable.

The temperature during storage of the solid electron beam-curable resin is limited to the above-defined range because storage at a temperature above 10° C. can result in insufficient protection of the electron beam-sensitive group, insufficient dispersion, and poor coating surface property. The temperature during the paint preparing process is limited to the above-defined range because temperatures of 100° C. or higher can result in insufficient protection of the electron beam-sensitive group, poor dispersion, and possible introduction of gelled resin during dissolving into a coating composition, which results in a coating with poor surface property.

Since an ethylenically unsaturated double bond is introduced by reacting (A) source vinyl chloride resin polymer having a hydroxyl group and a sulfur-containing polar group with (B) monomer, any desired degree of electron beam curing can be designed in terms of a molar ratio of (A) vinyl chloride copolymer having a hydroxyl group and another polar group to (B) monomer. The reaction of (A) vinyl chloride copolymer having a hydroxyl group and another polar group with (B) monomer is carried out at a reaction temperature of up to 60° C. by optionally dissolving the vinyl chloride copolymer having a hydroxyl group and another polar group in any well-known organic solvent which does not participate in the reaction, and using any well-known reaction catalyst and any well-known radical polymerization inhibitor such as hydroquinone. A solid electron beam-curable vinyl chloride resin is commercially available as MR-301 from Nippon Zeon K.K. The present invention favors use of this resin.

A liquid modified resin is commercially available as TB-0246 from Toyobo K.K. Such a liquid electron beam-curable resin can be converted into a solid before use. One method for converting into a solid is by dispersing a liquid resin in a solvent in which an electron beam-curable resin is less soluble (e.g., acetone, methyl alcohol and water) whereby the resin solids precipitate therefrom. The liquid resin used herein may be either a resin which itself is liquid or for stability and other reasons, a solution of a resin in a solvent in which the resin is highly soluble such as methyl ethyl ketone (MEK). In this method, the solids are separated and dried before use.

An alternative method which can be employed herein is by solidifying a resin while modifying it to be electron beam curable. More particularly, a source vinyl chloride resin in solid form, typically powder form is combined with a modifying compound having a (meth)acryl group in liquid state, agitated therewith for reaction, and then dried. The modifying compound having a (meth)acryl group may be either a compound which itself is liquid or a solution of a compound in a solvent. It is also possible to disperse a solid source vinyl chloride resin in a solvent in which the resin is less soluble Such as water, add thereto a modifying compound in liquid state and agitate the mixture for reaction whereupon an end product is obtained by separating and drying solids.

In these cases, the solid electron beam-curable resin may be used alone, but preferably in combination with another electron beam-curable resin. The electron beam-curable resin combined is preferably liquid and such examples include liquid vinyl chloride resins, polyether polyurethane resins, and polyester polyurethane resins. The use of a liquid electron beam-curable resin is effective in imparting elasticity to a resultant coating and offers ease of manufacture. The proportion of the solid electron beam-curable resin in the entire binder resins may be at least 30% by weight, preferably 40 to 80% by weight. The electron beam-curable polyurethane resin which is preferably used in combination may be 20 to 70% by weight, preferably 30 to 60% by weight of the entire binder resins. In addition to these resins, a polyfunctional (trifunctional or more) (meth)acrylic monomer may be contained for promoting crosslinking. The amount of such a monomer added is preferably up to 30% by weight, more preferably 5 to 20% by weight of the entire resin weight. Therefore, the proportion of solid resin to liquid resin is preferably from 30/70 to 70/30 in weight ratio.

In these embodiments, the pigment is mainly an inorganic pigment, especially preferably carbon such as carbon black as mentioned above. The carbon used herein may be either structural carbon having excellent electrical conductivity and a developed structure or non-structural carbon having an underdeveloped structure, depending on a particular purpose. The content of carbon in the coating composition may be 50 to 100 parts by weight for forming the backcoat layer, 30 to 100 parts by weight for forming the undercoat layer, and 50 to 100 parts by weight for forming the magnetic layer per 100 parts by weight of the binder. The solvent used herein is not critical while it may be selected for a particular purpose from ketone solvents such as methyl ethyl ketone, methyl isobutyl ketone, acetone and cyclohexanone and aromatic solvents such as toluene as previously described. The content of the solvent in the coating composition is not critical. If necessary, the coating composition may contain various additives, for example, surface active agents such as fatty acids, fatty acid esters, and silicone oil and lubricants. It is understood that a coating composition for forming the magnetic layer should further contain ferromagnetic fine powder as previously mentioned. The solvent in the magnetic coating composition may be the same as previously described. The content of the solvent is not critical while it is preferably about 100 to 1,000 parts by weight per 100 parts by weight of the ferromagnetic fine powder.

Such coating compositions are prepared by adding necessary components including a pigment such as carbon, a solid electron beam-curable resin, ferromagnetic fine powder when the coating composition is for forming the magnetic layer, a solvent and other components, and mixing them for dispersion. Dispersion is generally effected by kneading the components in a kneader, for example, kneading under pressure or kneading in a continuous manner. Also employable are mixing rolls as in a two-roll mill. Moreover they may be used in combination. During dispersion by kneading, the temperature of the mixture being milled rises from an initial temperature of 20 to 40° C. generally to a maximum temperature of 80 to 150° C. though it depends on the initial temperature setting of the equipment. In the practice of the invention, the kneader or two-roll mill is cooled with coolant water so that the temperature of the mixture being milled may remain below 100° C.

Further, the milling dispersion is further dispersed by further adding a solvent for dissolution. This dissolution is generally effected using an agitator (Disper). Also during such dispersion, the temperature of the preparation being dispersed rises from an initial temperature of 20 to 30° C. generally to a maximum temperature of 50 to 100° C. though it depends on the initial temperature setting of the equipment. In the practice of the invention, the temperature of the preparation being dispersed is kept below 100° C. by passing cool water or warm water through a jacket surrounding the dissolving vessel. In this way, there is obtained a coating composition which generally has a viscosity of about 5 to 50 centipoise and is convenient to use. Instead of the kneader, mixers or blenders may be used in the above procedure. A dispersion technique with concomitant milling using mills loaded with beads of glass, ceramics (e.g., zirconia), iron and tungsten carbide may also be applied. In any of the dispersion techniques, the temperature of the preparation being dispersed is kept below 100° C. in the practice of the invention.

The stage in the coating composition preparing process at which the temperature of the preparation being dispersed rises is the mixing/dispersing or dissolving/dispersing step mentioned above and the temperature during this step should preferably be kept below 100° C. The entire processing time of the kneading step is generally 5 to 180 minutes and it is contemplated that the temperature is held below the abovementioned maximum temperature for a time of about 30 to 90% of the entire processing time. The entire processing time of the dissolving step is generally 30 minutes to 10 hours and a substantially constant temperature is maintained.

The magnetic recording medium prepared using such coating compositions is, as partially referred to above, of the type having a magnetic layer formed on at least one surface of a non-magnetic substrate of various resins such as polyethylene terephthalate, polyethylene naphthalate, aramides and polyamides, optionally through an undercoat layer. It also has a backcoat layer on the other surface of the non-magnetic substrate if necessary. At least one layer of the backcoat, undercoat and magnetic layers is formed using the coating composition defined in the present invention.

In this embodiment, the electron beam-curable resin in the layer formed using the coating composition defined herein is desirably cured using electron beams in a dose of 10 to 200 kGray, preferably 30 to 200 kGray, especially 30 to 100 kGray, more preferably 30 to 70 kGray and with an irradiation energy (accelerating voltage) of at least 100 kV, preferably 100 to 750 kV, especially 150 to 750 kV. Electron beam is desirably irradiated after coating and drying and prior to winding into a roll. Also electron beam may be irradiated during cutting to a predetermined width after winding into a roll, during pressing to a predetermined shape, or after pressing. The backcoat layer formed using a coating composition as defined herein generally has a thickness of about 0.1 to 3 μm. The backcoat layer may be formed by applying the coating composition by any well-known technique, effecting drying and surface smoothing treatment, followed by curing. Usually the magnetic layer is formed after the backcoat layer has been formed.

The undercoat layer formed using a coating composition as defined herein generally has a thickness of about 0.05 to 5 μm. The undercoat layer may be formed by applying the coating composition by any well-known technique, effecting drying and surface smoothing treatment, followed by curing.

The magnetic layer using a magnetic coating composition containing ferromagnetic fine powder generally has a thickness of about 0.1 to 5 μm. The magnetic layer may be formed by applying a magnetic coating composition by any well-known technique and effecting orientation in a magnetic field or mechanical orientation, followed by drying, surface smoothing, and curing. It is understood that the magnetic layer may be applied onto the undercoat layer after the undercoat layer has been dried and cured, or applied onto the undercoat layer before the undercoat is dried whereupon both the layers are simultaneously cured. Alternatively, a simultaneous multi-layer coating technique in which the magnetic layer and the undercoat layer are simultaneously coated is employable. There may be made various other modifications including the use of a magnetic layer of the continuous thin film type.

EXAMPLE

Examples of the present invention are given below by way of illustration.

EXAMPLE 1

A magnetic tape having a backcoat layer and a magnetic layer for DAT use was fabricated as follows. The parts of components are parts by weight.

| Backcoat layer | |
|---|---|
| Carbon black (particle size 0.02 μm, BET 220 m$^2$/g) | 100 |
| Carbon black (particle size 0.34 μm, BET 8 m$^2$/g) | 5 |
| Abrasive (α-alumina, particle size 0.2 μm, α-conversion 85%) | 1 |
| Electron beam-curable vinyl chloride resin (30% MEK solution of TB-0246) | 300 |
| Electron beam-curable urethane (35% MEK solution of TB-0242) | 70 |
| Methyl ethyl ketone (MEK) | 200 |
| Toluene | 200 |

These components were admitted into a ball mill and dispersed for 15 hours. The following components were added to the dispersion which was dispersed for a further 3 hours, preparing a backcoat layer coating composition or paint.

| Butyl stearate | 1 |
|---|---|
| MEK | 500 |
| Toluene | 500 |

The backcoat coating paint was applied to a polyester film of 10 μm thick. Using an electro-curtain type electron beam accelerator, electron beam was irradiated to the coating in $N_2$ gas at an accelerating voltage of 150 kV, an electrode current of 10 mA, and an absorption dose of 50 kGray. The coating was thus cured into a backcoat layer of 0.5 μm thick.

| Magnetic layer | |
|---|---|
| Metal magnetic powder (specific surface area 50 m$^2$/g, Hc = 1500 Oe, $\sigma_s$ = 120 emu/g) | 100 |
| Abrasive (α-alumina, α-conversion 65%, particle size 0.2 μm) | 10 |
| Carbon black (particle size 0.34 μm, BET 8 m$^2$/g) | 5 |
| Electron beam-curable vinyl chloride resin (20% MEK solution of TB-0246) | 80 |
| Electron beam-curable urethane (30% MEK solution of TB-0242) | 13 |
| MEK | 50 |
| Toluene | 50 |

These components were admitted into a sand mill and dispersed for 13 hours. The following components were added to the dispersion which was dispersed for a further 2 hours, preparing a magnetic coating composition or paint.

| Stearic acid | 2 |
|---|---|
| Butyl stearate | 2 |
| MEK | 100 |
| Toluene | 100 |

This magnetic paint was applied to the opposite side of the substrate having the backcoat layer to form a coating, which was subjected to orientation in a magnetic field, dried, calendered and thereafter cured by irradiating electron beams under the same conditions as above, forming a magnetic layer of 3 μm thick. There was obtained a magnetic tape for DAT use. This is designated sample No. 1.

It is to be noted that TB-0246 and TB-0242 are an electron beam-curable (EBC) vinyl chloride (VC) resin having a sulfur (S)-containing polar group and a urethane (U) resin having a phosphorus (P)-containing polar group manufactured by Toyobo K.K., respectively. These resins have the chemical structures described as being most preferred in this disclosure.

TB-0246

Vinyl Chloride/epoxy-containing monomer copolymer

Average degree of polymerization: 310

Epoxy content: 3% by weight

Potassium persulfate used

S content: 0.6% by weight

Using 2-isocyanatoethyl methacrylate (MOI, hereinafter), MR-110 manufactured by Nippon Zeon K.K. was acryl modified.

Acryl content: 6 mol/mol

TB-0242

Hydroxyl-containing acrylic compound/phosphonic group-containing phosphorus compound/hydroxyl-containing polyester polyol Average molecular weight: 23,000

P content: 0.2% by weight

Acryl content: 8 mol/mol

As in sample No. 1, another sample was prepared using an acryl-modified (urethane-modified) product of MR-110 manufactured by Nippon Zeon K.K. as the vinyl chloride resin in the backcoat layer. For urethane modification, an adduct (THA) of tolylene diisocyanate and 2-hydroxyethyl methacrylate was used. The acryl content was 10 mol/mol. This is designated sample No. 2.

As in sample No. 1, another sample was prepared using an acryl-modified by ester modification product of MR-110 as the vinyl chloride resin in the backcoat layer. For ester modification, maleic anhydride and glycidyl methacrylate were used. The acryl content was 8 mol/mol. This is designated sample No. 3.

As in sample No. 1, another sample was prepared by substituting nitrocellulose for the vinyl chloride resin and a thermosetting (TS) urethane (U) resin having a sulfur (S)containing polar group for the urethane resin in the backcoat layer (the same weight ratio of 4:6). The TSU(S) is a urethane resin formed from phthalic acid system polyester polyol and diphenylmethane diisocyanate, having a molecular weight of 23,000 and containing 0.005% by weight of $SO_3Na$. The crosslinking agent used was Colonate L manufactured by Nippon Polyurethane K.K. This is designated sample No. 4.

The thus obtained tapes of sample Nos. 1 to 4, each in a length of 60 m, were incorporated in R-DAT cassette halves and tested for blocking, dusting, BER, and surface roughness (Ra according to JIS B 0601). Dusting was rated "O" or "X" by visually observing how the guide pin was stained after a durability run test. Blocking was measured by fixing one end of a test tape of 1 meter long to a glass tube of 36 mm in diameter, suspending a weight of 110 grams from the other end of the tape, slowly rotating the glass tube for winding the tape in order with the magnetic side inside, securing the tape so that tension was maintained, removing the weight, and storing at a temperature of 45°±30° C. and a relative humidity of 80±5% for 4 hours. Thereafter, the tape was allowed to stand for 24 hours under test environment conditions. After a weight of 10 grams was attached to the trailing end of the tape, the tape was slowly unraveled for observing how smoothly or stickingly the tape was separated between turns and rated "O" or "X".

Random blocking error rate (BER) was measured by recording a 1-kHz sinusoidal wave signal which was 3 dB lower than the full scale level in both L and R channels of a test tape at an arbitrary portion. Upon reproduction, the number of C1 error generating blocks was counted per second and its ratio to the decode block number per second was calculated. Measurements were made only on the main area and continuously for more than 6 minutes, an average thereof being a measurement value. The results are shown in Table 1.

TABLE 1

| Sample | 1 (invention) | 2 | 3 (comparison) | 4 |
|---|---|---|---|---|
| Modification | Urethane (MOI) | Urethane (THA) | Ester | Thermosetting |
| Blocking | O | O | O | O |
| Dusting | O | O | X | O |
| BER ($\times 10^{-4}$) | 0.5 | 5.3 | 259.0 | 6.9 |
| Backcoat layer surface roughness (RA, nm) | 15.6 | 28.1 | 22.7 | 19.7 |

In Table 1, sample No. 3 (comparative example) using ester modified resin was poor in dusting and BER because the backcoat layer was brittle. Sample No. 2 (comparative example) using urethane (THA) modified resin was poor in BER and surface roughness because the coating composition was poor in dispersion. Sample No. 4 (comparative example) using thermosetting resin was poor in BER because topographical transfer (the rough surface of the backcoat layer toughened the magnetic layer surface in contact) occurred during thermosetting in roll form.

Additionally, as in sample No. 1, another sample was prepared using only TB-0246 (EBCVC(S)) as the electron beam-curable resin in the magnetic layer. This is designated sample No. 5.

As in sample No. 1, another sample was prepared using only TB-0242 (EBCU(P)) as the electron beam-curable resin in the magnetic layer. This is designated sample No. 6.

As in sample No. 1, another sample was prepared using EBCVC(COOH) 80+EBCU(COOH) 13 as the electron beam-curable resin in the magnetic layer. EBCVC(COOH) is an electron beam-curable vinyl chloride resin containing COOH and EBCU(COOH) is an electron beam-curable urethane resin containing COOH. This is designated sample No. 7.

EBCVC(COOH)

Vinyl chloride/vinyl acetate/vinyl alcohol/maleic acid copolymer

Average degree of polymerization: 400

COOH content: 1% by weight

Acryl content: 10 mol/mol

EBCU(COOH)

Hydroxyl-containing acryl compound/carboxyl-containing compound/hydroxyl-containing polyester polyol/ diphenylmethane diisocyanate Average degree of polymerization: 25,000

COOH content: 1% by weight

Acryl content: 6 mol/mol

As in sample No. 1, other samples were prepared by combining EBCVC and EBCU in the same ratio as VC:V as shown in Table 2 and using them as the electron beam-curable resin. These are designated sample Nos. 8 and 9.

As in sample No. 1, another sample was prepared by substituting thermosetting (TS) vinyl chloride resin (TSVC(S)) and urethane resin (TSU(S)) for EBCVC and EBCU, respectively. The ratio of VC:U was identical. TSVC(S) is MR-110 manufactured by Nippon Zeon K.K. which corresponds to TB-0246 or EBCUC(S) prior to modification. TSU(S) is a urethane resin formed from phthalic acid system polyester polyol and diphenylmethane diisocyanate, having a molecular weight of 23,000, and containing 0.005% of $SO_3Na$. The crosslinking agent used was Colonate L manufactured by Nippon Polyurethane K.K. This is designated sample No. 10.

The thus obtained tapes of sample Nos. 1 and 5 to 10 were measured for surface gloss (gloss at 60 degrees), electromagnetic characteristics (deck: Sony DTC-1000ES, reference: Sony RSD-1079), BER (block error rate, deck: Sharp RX-X100), and surface roughness Ra according to JIS B 0601 (Talistep).

Among these, the electromagnetic characteristics were measured under the following conditions using a R-DAT deck model DTC-1000ES manufactured by Sony Corporation modified for RF input/output.

Mode: normal track mode

Tape speed: 8.15 mm/s

Measured track: positive azimuth track

For electromagnetic characteristics, the following reference tape was used as a reference.

Reference tape: Sony RSD-1079

Measurement was done by effecting bulk demagnetization, using a rectangular wave input signal, and measuring the fundamental frequency of an output signal by means of a spectral analyzer. The block error rate (BER) was a change of BER measurement after storage at 60° C./RH 90% for 5 days. The results are shown in Table 2.

TABLE 2

| Sample No. | 1 (Invention) | 5 (Comparison) | 6 (Comparison) | 7 (Comparison) | 8 (Comparison) | 9 (Comparison) | 10 (Comparison) |
|---|---|---|---|---|---|---|---|
| Vinyl chloride (VC) | EBC (S) | EBC (S) | — | EBC (COOH) | EBC (S) | EBC (COOH) | TS (S) |
| Urethane (U) | EBC (P) | — | EBC (P) | EBC (COOH) | EBC (COOH) | EBC (P) | TS (S) |
| Gloss (degree %) | | | | | | | |
| Dispersed | | | | | | | |
| 1 hr | 27 | 22 | 19 | 5 | 10 | 10 | 23 |
| 5 | 81 | 70 | 62 | 17 | 25 | 19 | 77 |
| 9 | 100 | 91 | 85 | 28 | 46 | 35 | 93 |
| 13 | 114 | 101 | 93 | 33 | 75 | 40 | 100 |
| As calendered | 190 | 177 | 185 | 66 | 122 | 74 | 182 |
| Electro- 130 kHz | +1.6 | +0.5 | +1.5 | −3.6 | −1.8 | −3.1 | +1.0 |
| magnetic 4.7 MHz characteristic (dB) | +2.0 | +0.3 | +1.8 | −5.0 | −2.2 | −4.4 | +1.2 |
| BER ($\times 10^{-4}$) | 0.5 | 9.2 | 8.6 | 259.0 | 29.7 | 211.1 | 6.9 |
| Surface roughness (Ra:nm) | 5.1 | 7.1 | 3.0 | 38.6 | 11.8 | 32.9 | 6.5 |
| Change of BER after 5 day storage at 60° C., RH 90% (%) | 10 | 19 | 32 | 72 | 14 | 70 | 125 |

The effectiveness of the present invention is evident from the results shown in Table 2.

EXAMPLE 2

A magnetic recording medium in the form of a magnetic tape having a backcoat layer and a magnetic layer was fabricated as follows. The parts of components are parts by weight.

| Backcoat layer | |
|---|---|
| Carbon black (particle size 0.02 μm, BET 220 m²/g) | 100 |
| Carbon black (particle size 0.34 μm, BET 8 m²/g) | 5 |
| Abrasive (α-alumina, particle size 0.2 μm, α-conversion 85%) | 1 |
| Electron beam-curable vinyl chloride (containing S and P, 30% MEK solution) | 300 |
| Electron beam-curable urethane (35% MEK solution) | 70 |
| MEK | 200 |
| Toluene | 200 |

These components were admitted into a ball mill and dispersed for 15 hours. The following components were added to the dispersion which was dispersed for a further 3 hours, preparing a backcoat layer coating composition or paint.

| Butyl stearate | 1 |
|---|---|
| MEK 500 | 500 |
| Toluene | 500 |

The backcoat coating paint was applied to a polyester film of 10 μm thick to a thickness of 0.5 μm. Using an electro-curtain type electron beam accelerator, electron beam was irradiated to the coating from the polyester film side, that is, indirectly through the polyester film, in N₂ gas at an accelerating voltage of 150 kV, an electrode current of 10 mA, and an absorption dose of 50 kGray. The coating was thus cured into a backcoat layer.

| Magnetic layer | |
|---|---|
| Metal magnetic powder (specific surface area 50 m²/g, Hc = 1500 Oe, $\sigma_s$ = 120 emu/g) | 100 |
| Abrasive (α-alumina, particle size 0.2 μm, α-conversion 65%) | 10 |
| Carbon black (particle size 0.34 μm, BET 8 m²/g) | 5 |
| Electron beam-curable vinyl chloride (containing S, 20% MEK solution) | 80 |
| Electron beam-curable urethane (containing P, 30% MEK solution) | 13 |
| MEK | 50 |
| Toluene | 50 |

These components were admitted into a sand mill and dispersed for 13 hours. The following components were added to the dispersion which was dispersed for a further 2 hours, preparing a magnetic coating composition or paint.

| Stearic acid | 2 |
|---|---|
| Butyl stearate | 2 |
| MEK | 100 |
| Toluene | 100 |

After one hour from curing of the backcoat layer, this magnetic paint was applied to the side of the substrate remote from the backcoat layer to form a coating, which was subjected to orientation in a magnetic field, dried, calendered and thereafter cured by irradiating electron beams under the same conditions as above, forming a magnetic layer of 3 μm thick. There was obtained a magnetic recording medium in the form of a magnetic tape for DAT use. This is designated sample No. 21 (identical with sample No. in Example 1).

Another magnetic recording medium was prepared under the same conditions including materials as above except for an electron beam irradiating mode, in accordance with a conventional method of preparing magnetic recording media, that is, by first coating a backcoat layer, irradiating electron beams directly to the coating for curing, then coating a magnetic layer, and irradiating electron beams directly to the coating for curing. This is designated sample No. 22 (comparative example).

Next, sample Nos. 23 to 30 (comparative examples) were prepared. In these sample Nos. 23 to 30, the conditions were the same as in sample No. 21 except for an electron beam irradiating mode as will be described below. In the following description made in conjunction with electron beam, direct irradiation means the procedure of irradiating electron beams to a coating to be cured without any intervention, that is, directly, and indirect irradiation means the procedure of irradiating electron beams to a coating to be cured through at least a non-magnetic substrate.

Figure 1A:
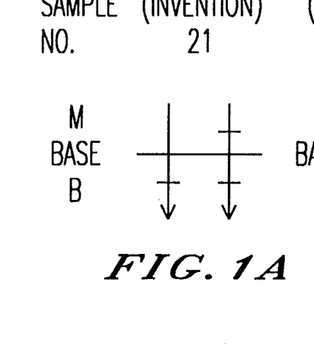
Figure 1B:
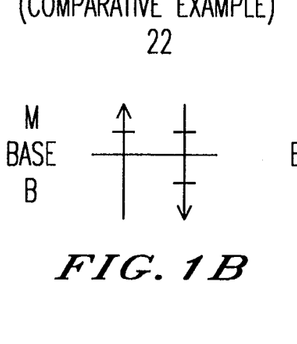
Figure 1C:
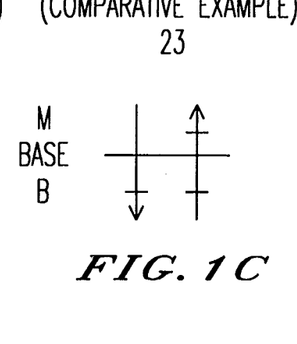
Figures 1D, 1E:
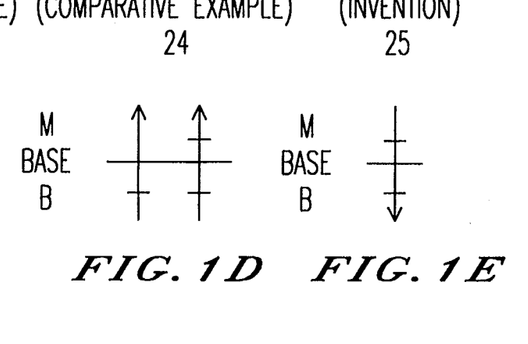
Figure 1F:
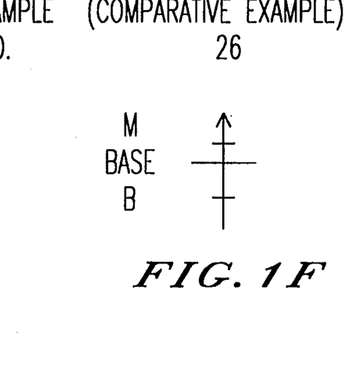
Figure 1G:
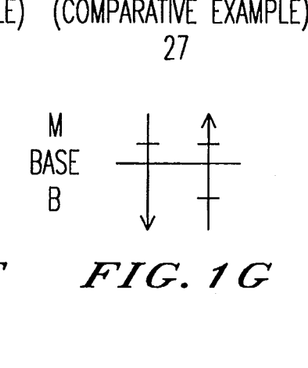
Figure 1H:
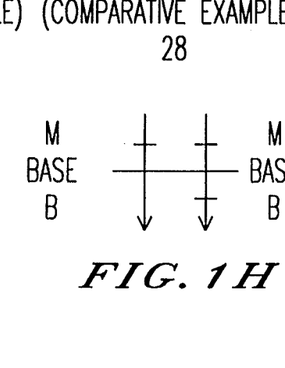
Figure 1I:
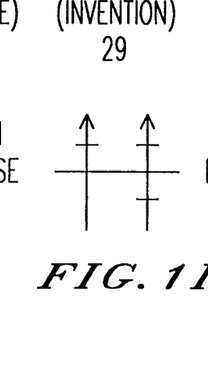
Figure 1J:
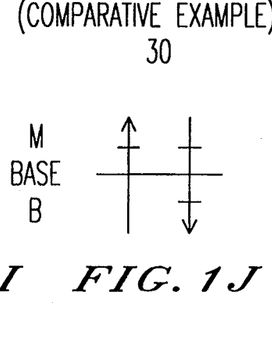

Sample No. 23 was prepared by the steps of coating of a backcoat layer, indirect irradiation of the backcoat layer, coating and indirect irradiation of a magnetic layer. Sample No. 24 was prepared by the steps of coating of a backcoat layer, direct irradiation of the backcoat layer, coating of a magnetic layer and indirect irradiation of the magnetic layer. After coating of a backcoat layer and a magnetic layer, electron beam was irradiated from the magnetic layer side to form sample No. 25 and electron beam was irradiated from the backcoat layer side to form sample No. 26. Sample No. 27 was prepared by the steps of coating and direct irradiation of a magnetic layer, coating and direct irradiation of a backcoat layer. Sample No. 28 was prepared by the steps of coating and direct irradiation of a magnetic layer, coating and indirect irradiation of a backcoat layer. Sample No. 29 was prepared by the steps of coating and indirect irradiation of a magnetic layer, coating and direct irradiation of a backcoat layer. Sample No. 30 was prepared by the steps of coating and indirect irradiation of a magnetic layer, coating and indirect irradiation of a backcoat layer. These modes of electron beam irradiation for sample Nos. 21 to 30 are schematically illustrated in FIG. 1, (a) to (j).

In the figure, M designates a magnetic layer, B designates a backcoat layer, and Base designates a non-magnetic substrate.

An arrow designates a direction of electron beam irradiation.

The magnetic recording media of sample Nos. 21 to 30 were examined by determining the bond strength of the magnetic layer, performing an abrasion test on the magnetic layer and backcoat layer, and measuring a block error rate. The results are shown in Table 3.

It is to be noted that the bond strength of the magnetic layer was determined by a bond strength test procedure using double side adhesive tape according to the JIS standard in an atmosphere at a temperature of 23° C. and a humidity of 60%. Abrasion was measured by incorporating a magnetic tape of 60 meters long in a R-DAT cassette half, operating a deck to feed the tape over its entire length, and thereafter observing how the rotary head and guide pins were stained.

The blocking error rate was determined by using a R-DAT deck model DTC-1000ES manufactured by Sony Corporation, recording a 1-kHz sinusoidal wave signal which was 3 dB lower than the full scale level in both L and R channels of a magnetic recording medium of each of the inventive examples and comparative examples at an arbitrary portion, reproducing the signal, counting the number of C error generating blocks per second and calculating its ratio to the decode block number per second. (It is to be noted that measurements were made only on the main area and continuously for more than 6 minutes, an average thereof being a measurement value.)

TABLE 3

| Sample No. | | Magnetic layer bond (g) | Magnetic layer abrasion | Backcoat layer abrasion | Block error rate ($\times 10^{-4}$) |
|---|---|---|---|---|---|
| 21 | Preferred Example | 23 | ○ | ○ | 0.5 |
| 22 | (Comparison) | 10 | ○ | X | 4.8 |
| 23 | (Comparison) | 19 | X | X | 19.5 |
| 24 | (Comparison) | 14 | X | X | 28.2 |
| 25 | (Comparison) | 9 | ○ | Δ | 3.0 |
| 26 | (Comparison) | 4 | X | X | 11.9 |
| 27 | (Comparison) | 10 | ○ | X | 9.4 |
| 28 | (Comparison) | 10 | ○ | Δ | 5.8 |
| 29 | (Comparison) | 7 | X | X | 18.7 |
| 30 | (Comparison) | 5 | ○ | Δ | 4.4 |

As seen from Table 3, the magnetic recording medium of the present invention (sample No. 21) shows no abrasion of the backcoat layer, improved adhesion between the magnetic layer and the substrate, minimized abrasion of the magnetic layer, and improved block error rate whereas in sample Nos. 22, 23, 24, 26, 27 and 29 (comparative examples) in which electron beam was irradiated directly to the backcoat layer, the backcoat layer was abradable due to a loss of flexibility and deteriorated in block error rate.

In the remaining samples, Nos. 25, 28 and 30 (comparative examples), the backcoat layer was short cured and the block error rate increased.

EXAMPLE 3

A backcoat layer coating composition of the following formulation was prepared.

| Formulation of backcoat layer coating composition | |
|---|---|
| Carbon black (BET 220 m$^2$/g, particle size 22 nm) | 100 pbw |
| Electron beam-curable vinyl chloride resin (powder form, MR-301 by Nippon Zeon K.K., containing S) | 80 pbw |
| Electron beam-curable polyether polyurethane resin (solution type, solids 40 wt %, number average molecular weight 20,000, containing P) | 20 pbw |
| Methyl ethyl ketone (MEK) | 16 pbw |
| Cyclohexanone | 4 pbw |

Note that the electron beam-curable vinyl chloride resin in powder form had a softening point of about 65° C.

These components were dispersed using a pressure kneader and a two-roll mill. More specifically, they were dispersed for 30 minutes in the pressure kneader and then 50 passes in the two-roll mill.

The following components were added to the dispersion which was dissolved and dispersed for a further 2 hours in a Disper.

| MEK/cyclohexanone/toluene (1/1/1) solvent mixture | 1000 pbw |
|---|---|
| Polyurethane resin (as above) | 200 pbw |

In this way, coating compositions or paints were prepared as shown in Table 4.

They are designated paint Nos. 31 to 34 in accordance with the storage temperature of the electron beam-curable vinyl chloride resin in powder form prior to use and the maximum temperature that the preparation experienced during paint preparing steps involving dispersion by kneading and dissolving.

The temperature of the preparation during dispersion was controlled by cooling the kneader and two-roll mill with coolant water, for example.

In the case of Disper, the liquid temperature of the solution was controlled by passing cold or hot water through the jacket.

The temperature was measured by actually reading a thermometer.

For paint Nos. 31 to 34, solubility and dispersibility were examined as follows. The results are shown in Table 4.

Solubility and Dispersibility

A paint as prepared, that is, a solution obtained immediately after dissolving the dispersion was judged for solubility and dispersibility using a grindometer. Judgment of solution and dispersion states was in accord with the method described in T. C. Patton, "Flow and Pigment Dispersion of Paint". Ratings in the Table are "O" for good, "Δ" for fairly poor, and "X" for poor.

Using paint Nos. 31 to 34, a coating of 1 μm thick was formed on a polyethylene terephthalate (PET) film of 14 μm thick. Using an electro-curtain type electron beam accelerator, electron beam was irradiated to the coating in $N_2$ gas at an accelerating voltage of 150 kV, an electrode current of 10 mA, and an absorption dose of 50 kGray, obtaining a coating of 0.5 μm thick. These coatings are designated coating Nos. 31 to 34 in accordance with the paints used.

Coating Nos. 31 to 34 were examined for gloss, surface roughness and gel fraction as follows. The results are shown in Table 4.

Gloss

Gloss was measured at 60 degrees.

Surface Roughness

Ra was measured according to JIS B 0601.

Gel Fraction

The gel fraction was determined by replacing the substrate by an aluminum foil, forming a coating of 3 μm thereon, curing it as above, immersing the cured coating in methyl ethyl ketone at 20° C., and hot extracting under the temperature condition of boiling point, measuring the weight left after extraction, and calculating in accordance with the following formula.

(weight after extraction)/(weight before extraction) × 100%

The coating was judged to have proceeded a higher degree of curing as the weight after extraction increased.

Additionally, as in paint Nos. 31 to 34, paint No. 35 was prepared by using 267 parts by weight of an electron beam-curable vinyl chloride resin of solution type (30% MEK solution of TB-0246) as defined below instead of the electron beam-curable vinyl chloride resin in power form, using 833 parts by weight of the solvent mixture as a solvent, and omitting the step using the two-roll mill. It is to be noted that the preparation remained at a temperature of about 50° C. during the paint preparing process. The electron beam-curable vinyl chloride resin was of solution type and fully stable so that no particular attention need be paid to the temperature during storage although it was stored at 0° C.

Paint No. 35 was measured for the properties like paint Nos. 31 to 34. The results are also shown in Table 4.

TABLE 4

| Paint or coating No. | | Storage temp. of electron beam-curable resin (powder) | Maximum temp. during paint preparing process | Solubility/ despersibility | Gloss | Ra | Gel fraction |
|---|---|---|---|---|---|---|---|
| 31 | Preferred (Invention) | 0° C. | 50° C. | O/O | 100% | 6 nm | 90% |
| 32 | (Comparison) | 0° C. | 100° C. | X/Δ | 50% | 15 nm | 50% |
| 33 | (Comparison) | 30° C. | 50° C. | Δ/Δ | 85% | 8 nm | 60% |
| 34 | (Comparison) | 30° C. | 100° C. | X/X | 60% | 12 nm | 70% |
| 35*1 | | 0° C. | 50° C. | (−)/Δ | 70% | 9 nm | 90% |

*1 Electron beam-curable vinyl chloride resin of solution type was used. Then solubility was not evaluated and represented by (−) because the evaluation standard was different.

The effectiveness of the present invention is evident from Table 4.

EXAMPLE 4

An undercoat layer coating composition or paint of the following formulation was prepared.

| Formulation of undercoat layer coating paint | |
|---|---|
| Carbon black (BET 220 m$^2$/g, particle size 22 nm) | 100 pbw |
| Electron beam-curable vinyl chloride resin (powder form, MR-301 by Nippon Zeon K.K., containing S) | 80 pbw |
| Electron beam-curable polyether polyurethane resin (solution type, solids 40 wt %, number average molecular weight 20,000, containing P) | 20 pbw |
| Methyl ethyl ketone (MEK) | 16 pbw |
| Cyclohexanone | 4 pbw |

The solvent in which the above-prepared dispersion is dissolved was the same solvent mixture as used in Example 3 and its amount was 833 parts by weight. Further added to the dispersion was 280 parts by weight of the same polyurethane resin as above.

In the same manner as backcoat layer paint Nos. 31 to 34 in Example 3, the undercoat layer coating paints were prepared. They are designated paint Nos. 41 to 44 in accordance with the storage conditions of powder form electron beam-curable vinyl chloride resin and the dispersing conditions during paint preparation for paint Nos. 31 to 34 in Example 3. Paint No. 45 was also prepared which corresponded to paint No. 35 in Example 1.

These paint Nos. 41 to 45 were measured for paint and coating properties as in Example 1. The results are shown in Table 5.

TABLE 5

| Paint or coating No. | | Storage temp. of electron beam-curable resin (powder) | Maximum temp. during paint preparing process | Solubility/ despersibility | Gloss | Ra | Gel fraction |
| --- | --- | --- | --- | --- | --- | --- | --- |
| 41 | Preferred Invention | 0° C. | 50° C. | O/O | 98% | 4 nm | 92% |
| 42 | (Comparison) | 0° C. | 100° C. | X/Δ | 40% | 13 nm | 53% |
| 43 | (Comparison) | 30° C. | 50° C. | Δ/Δ | 84% | 7 nm | 60% |
| 44 | (Comparison) | 30° C. | 100° C. | X/X | 60% | 11 nm | 78% |
| 45*1 | | 0° C. | 50° C. | (−)/Δ | 72% | 8 nm | 93% |

*1 Electron beam-curable vinyl chloride resin of solution type was used. Then solubility was not evaluated and represented by (−) because the evaluation standard was different.

EXAMPLE 5

A magnetic layer coating composition (or magnetic paint) of the following formulation was prepared.

| Formulation of magnetic paint | |
| --- | --- |
| Metal magnetic powder (specific surface area 50 m²/g, Hc = 1500 Oe, $\sigma_s$ = 120 emu/g) | 100 pbw |
| Abrasive (α-alumina, α-conversion 65%, particle size 0.2 μm) | 10 pbw |
| Electron beam-curable vinyl chloride resin (powder form, MR-301 by Nippon Zeon K.K., containing S) | 10 pbw |
| Electron beam-curable polyether polyurethane resin (solution type, solids 40 wt %, number average molecular weight 20,000, containing P) | 9 pbw |
| MEK | 145 pbw |
| Cyclohexanone | 220 pbw |
| Carbon black paint (2 pbw of carbon black) | 26.7 pbw |

Note that the carbon black paint used herein was the same as those used for back layer paint Nos. 1 to 4 in Example 3. Like backcoat layer paint Nos. 31 to 34 in Example 3, carbon black paint Nos. 31 to 34 for magnetic paint were prepared. Using these carbon black paints, the magnetic paints of the above formulation were prepared. They are designated magnetic paint Nos. 51 to 54 in accordance with carbon black paint Nos. 31 to 34 for magnetic paint. Magnetic paint No. 55 was also prepared which corresponded to paint No. 5 in Example 3.

There magnetic paints, Nos. 51 to 55 were examined for paint properties, coating gloss and coating surface roughness as in Example 3. The results are shown in Table 6. The coating surface was observed under a microscope with a magnifying power of X400 to count the number of foreign particles in a field. Ratings in Table 6 are "0" for 0 to 1 foreign particles, "A" for 2 to 4 foreign particles, and "X" for 5 or more foreign particles.

celerator, electron beam was irradiated to the coating in N₂ gas at an accelerating voltage of 150 kV, an electrode current of 10 mA, and an absorption dose of 50 kGray. The coating was thus cured into a backcoat layer of 0.5 μm thick.

The undercoat layer coating composition, paint No. 41 of Example 4, was applied to the surface of the substrate remote from the backcoat layer to form an undercoat layer of 0.5 μm thick. At the same time, magnetic paint No. 51 of Example 5 was applied onto the undercoat layer in an overlying manner so as to form a magnetic layer of 2 μm thick. The coating was subjected to orientation in a magnetic field, dried, calendered and thereafter cured by irradiating electron beams under the same conditions as above, forming a magnetic layer of 3 μm thick. There was obtained a magnetic tape for DAT use.

The thus obtained tape in a length of 60 m was incorporated in a R-DAT cassette half and tested for blocking, dusting, and blocking error rate (BER). Dusting was rated by visually observing how the guide pin was stained after a durability run test.

Blocking was measured by fixing one end of a test tape of 1 meter long to a glass tube of 36 mm in diameter, suspending a weight of 110 grams from the other end of the tape, slowly rotating the glass tube for winding the tape in order with the magnetic side inside, securing the tape so that tension was maintained, removing the weight, and storing at a temperature of 45°±3° C. and a relative humidity of 80±5% for 4 hours. Thereafter, the tape was allowed to stand for 24 hours under test environment conditions. After a weight of 10 grams was attached to the trailing end of the tape, the tape was slowly unraveled for observing how smoothly or stickingly the tape was separated between turns and rated.

Random blocking error rate (BER) was measured by recording a 1-kHz sinusoidal wave signal which was 3 dB lower than the full scale level in both L and R chan-

TABLE 6

| Paint or coating No. | | Storage temp. of electron beam-curable resin (powder) | Maximum temp. during paint preparing process | Solubility/ despersibility | Gloss | Ra | Microscope observation |
| --- | --- | --- | --- | --- | --- | --- | --- |
| 51 | Preferred Invention | 0° C. | 50° C. | O/O | 153% | 5 nm | O |
| 52 | (Comparison) | 0° C. | 100° C. | X/Δ | 135% | 9 nm | X |
| 53 | (Comparison) | 30° C. | 50° C. | Δ/Δ | 145% | 7 nm | Δ |
| 54 | (Comparison) | 30° C. | 100° C. | X/X | 140% | 8 nm | X |
| 55*1 | | 0° C. | 50° C. | (−)/Δ | 138% | 8 nm | Δ |

*1 Electron beam-curable vinyl chloride resin of solution type was used. Then solubility was not evaluated and represented by (−) because the evaluation standard was different.

EXAMPLE 6

The backcoat layer coating composition, paint No. 1 of Example 3, was applied to a polyester film of 10 μm thick. Using an electro-curtain type electron beam acnels of a test tape at an arbitrary portion. Upon reproduction, the number of C1 error generating blocks was counted per second and its ratio to the decode block number per second was calculated. Measurements were made only on the main area and continuously for more than 6 minutes, an average thereof being a measurement value.

The tape was free from dusting and blocking and had a BER of about $1.5 \times 10^{-4}$ which indicated a reduced error rate in high density digital recording, exhibiting excellent tape performance. Surface roughness Ra was measured as in Example 3 to find that it was 6.5 nm on the backcoat layer side and 4.0 nm on the magnetic layer side, indicating improved surface properties.

The tape was also examined for electromagnetic characteristic. The electromagnetic characteristic was measured under the following conditions using a R-DAT deck model DTC-1000ES manufactured by Sony Corporation modified for RF input/output.

Mode: normal track mode
Tape speed: 8.15 mm/s
Measured track: positive azimuth track For electromagnetic characteristics, the following reference tape was used as a reference.

Reference tape: Sony RSD-1079

Measurement was done by effecting bulk demagnetization, using a rectangular wave input signal, and measuring the fundamental frequency Of an output signal by means of a spectral analyzer. The results are +1.5 dB at 130 kHz and 2.1 dB at 4.7 MHz, indicating excellent electromagnetic characteristics.

ADVANTAGES

The present invention offers advantages including improved rigidity and dispersibility, improved surface smoothness, minimized dusting and blocking, reduced error rates in high density digital recording, and good storage stability.

The method of preparing the magnetic recording medium according to the present invention is designed so as to indirectly irradiate electron beams to a backcoat layer through a non-magnetic substrate, thus producing the backcoat layer having an appropriate degree of curing and flexibility.

Since a magnetic layer is formed after electron beams for curing of the backcoat layer are irradiated to the non-magnetic substrate, the bond strength of the magnetic layer to the non-magnetic substrate is improved.

The present invention further provides a coating composition using an electron beam-curable resin as a binder and having a pigment such as carbon dispersed therein wherein an electron beam-functional group remains fully stable and the pigment is satisfactorily dispersed.

The magnetic recording medium prepared using such a coating composition exhibits improved characteristics.

We claim:

1. A magnetic recording medium comprising:
   (a) a non-magnetic substrate;
   (b) a magnetic layer on said substrate; and
   (c) a backcoat layer on said substrate;
   wherein said magnetic layer and said backcoat layer comprise a resin cured with electron beams,
   said magnetic layer comprises a binder and magnetic particles, and
   said resin comprises,
   (1) an electron beam-curable vinyl chloride resin having a sulfur-containing polar group, and
   (2) an electron beam-curable urethane resin having a phosphorous-containing polar group,
   wherein said sulfur-containing polar group is selected from the group consisting of a sulfate group and a sulfonate group, said phosphorous-containing polar group is selected from the group consisting of phosphoric group, phosphinic group and phosphinous group, said electron beam-curable vinyl chloride resin is obtained by modifying a vinyl chloride resin having a sulfur-containing polar group with a monomer having ethylenically unsaturated double bond and an isocyanato group, and
   said electron beam-curable urethane resin is obtained from a monomer having a phosphinic moiety, phosphinous moiety or phosphoric moiety.

2. The magnetic recording medium of claim 1 wherein said sulfate and sulfonate groups are —SO$_4$K and —SO$_3$K, respectively.

3. The magnetic recording medium of claim 1 wherein said ethylenically unsaturated double bond is joined to the skeleton of the vinyl chloride resin through a urethane bond.

4. The magnetic recording medium of claim 1 wherein said electron beam-curable urethane resin contains PO$_3$Na as the phosphorus-containing polar group.

5. The magnetic recording medium of claim 1 wherein said electron beam-curable vinyl chloride resin and said electron beam-curable urethane resin are contained in a weight ratio of from 70:30 to 90:10.

6. The magnetic recording medium of claim 1 wherein said backcoat layer contains a pigment.

7. The magnetic recording medium of claim 1 wherein
   a backcoat layer coating composition is coated to the one surface of said non-magnetic substrate and then cured by irradiating electron beams to the backcoat layer coating through said non-magnetic substrate, and
   thereafter, a magnetic layer coating composition is coated to the other surface of said non-magnetic substrate remote from the backcoat layer and finally cured by irradiating electron beams directly to the magnetic layer coating.

8. The magnetic recording medium of claim 1 wherein the magnetic layer is coated and cured within at least 24 hours after curing of the backcoat layer.

9. The magnetic recording medium of claim 1 wherein
   at least one of said resins is a resin which is solid at room temperature,
   said solid resin is stored at a temperature of not higher than 10° C. before a coating composition is prepared therefrom, and
   the temperature during preparation of the coating composition is lower than 100° C.

10. The magnetic recording medium of claim 9 wherein said coating composition contains a pigment.

11. The magnetic recording medium of claim 10 wherein said pigment is carbon.

12. The magnetic recording medium of claim 9 wherein said undercoat layer comprises said resin cured with electron beams.

13. The magnetic recording medium of claim 1, further comprising an undercoat layer between said substrate and said magnetic layer.

14. The magnetic recording medium of claim 13, wherein
   at least one of said resins is a resin which is solid at room temperature,
   said solid resin is stored at a temperature of not higher than 10° C. before a coating composition is prepared therefrom, and
   the temperature during preparation of the coating composition is lower than 100° C.

* * * * *